United States Patent Office 3,446,319
Patented May 27, 1969

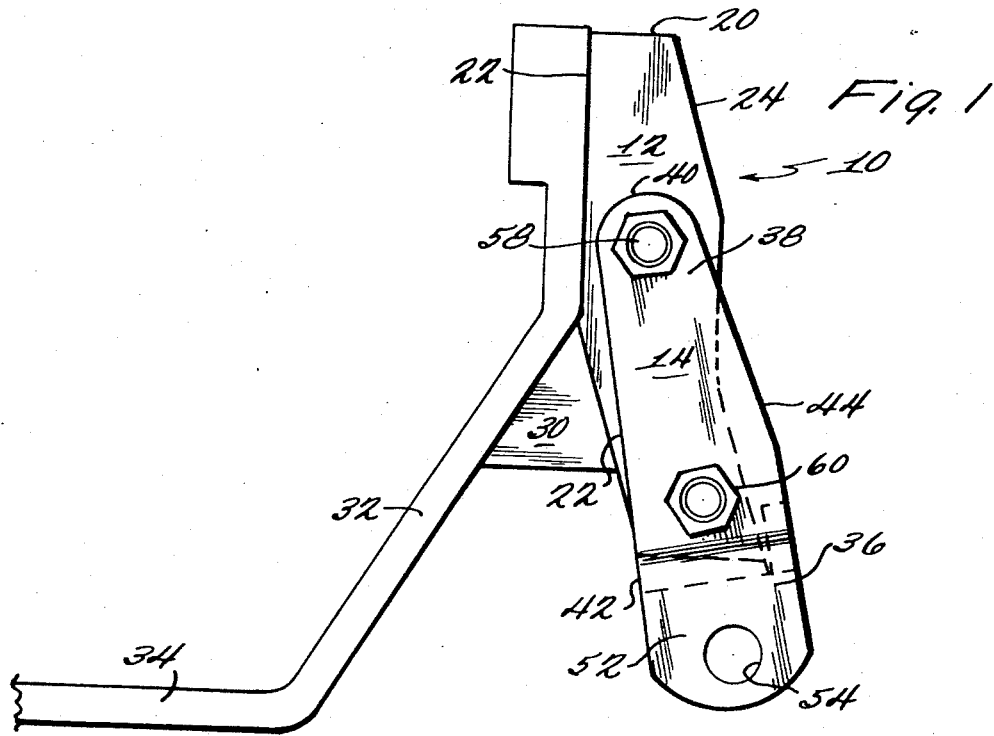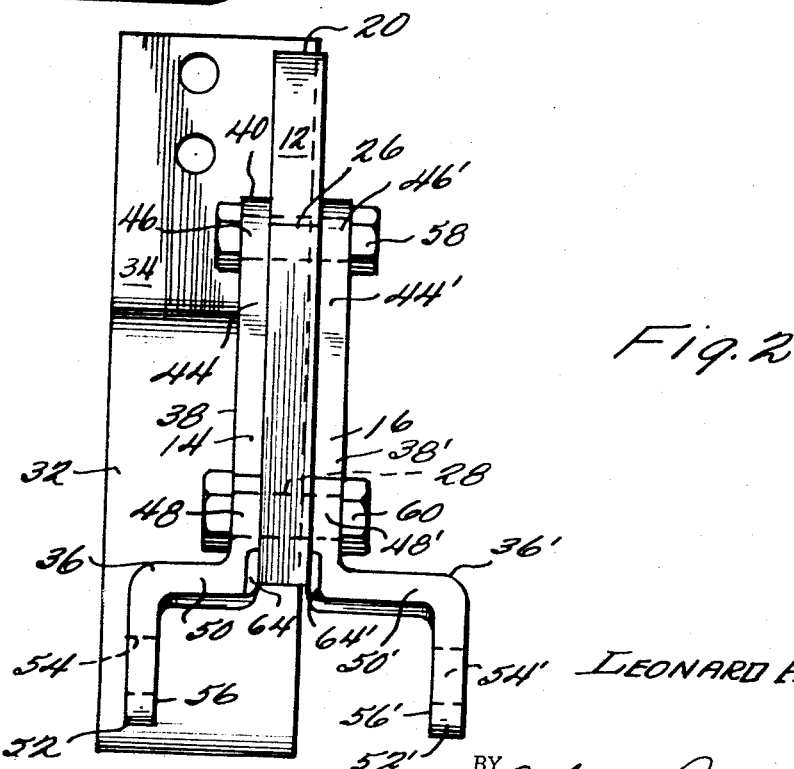

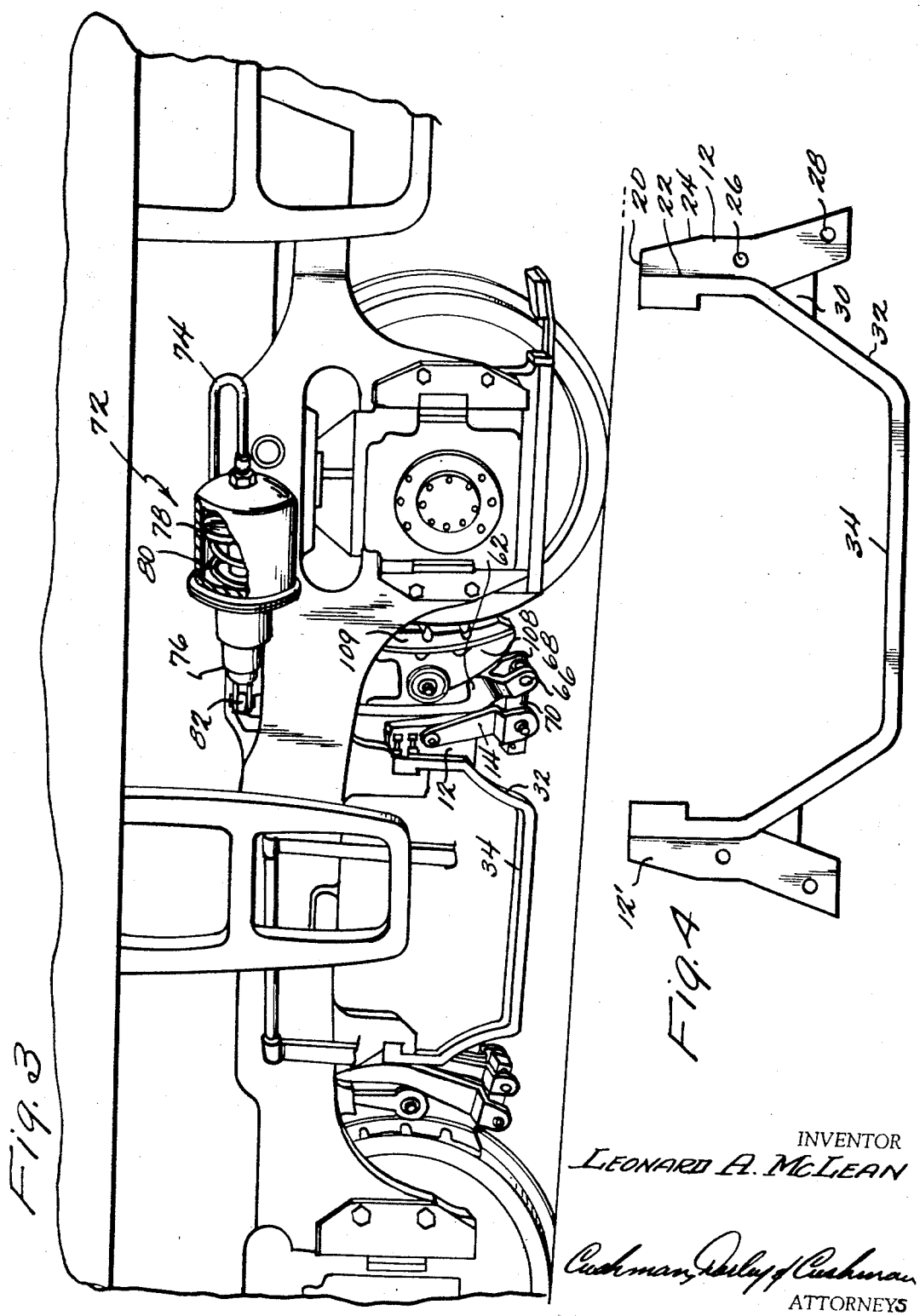

3,446,319
BRAKE RIGGING MODIFICATION FOR
COMPOSITION BRAKE SHOES
Leonard A. McLean, Jacksonville, Fla., assignor to
Atlantic Coast Line Railroad Company, Jacksonville, Fla., a corporation of Virginia
Filed Apr. 3, 1967, Ser. No. 627,765
Int. Cl. F16d 65/14, 65/52
U.S. Cl. 188—206           12 Claims

ABSTRACT OF THE DISCLOSURE

A unique bracket permanently fastened to an existing spring plank safety strap of a diesel locomotive truck, which permits the conversion of the braking system of the locomotive truck from a double shoe clasp-type of assembly to a single brake shoe assembly. The bracket consists of three separate plates with a stop plate welded to the spring plant safety strap and the other two plates fixedly secured on either side of the first member. The second and third members have downwardly extending flanges between which is fastened one end of a slack adjuster, which, in turn, is connected to and provides a fixed fulcrum for the bottom of the vertical brake head actuating lever.

Brief description of the invention

The invention is related to a novel conversion bracket for the brake system of a diesel locomotive truck and more specifically, the invention is related to a bracket for providing a fixed pivot for a vertical brake lever, whereby the brake system may be converted from the clasp-type of brake assembly to a single brake shoe assembly.

The most common method of braking or retarding the motion of railroad locomotives and cars is to utilize brake shoes arranged to press against the outer periphery of the wheels. This is accomplished by the use of levers, rods and linkages which receive an actuating force from a piston and cylinder. When braking is desired, the cylinder is filled with air under pressure. This causes a piston to move, under force from the air pressure, and transmit the energy to the brake shoes to bring about a retardation in the turning of the wheels. The amount of retardation is dependent on the air pressure admitted to the cylinder.

The brake rigging may be designed to work with one brake shoe on each wheel, known as single shoe brakes, or with two brake shoes on each wheel, known as clasp brakes. Most modern diesel locomotives use metallic brake shoes which are cast of iron with certain other ingredients. The coefficient of friction of these shoes, when in contact with the steel wheels of the locomotives, is such that it has been necessary to equip the locomotives with clasp brakes in order to obtain a sufficient braking capacity.

However, a new development in brake shoe design has become available in the last few years, involving the use of non-metallic materials, consisting predominantly of a composition of rubber, asbestos and other components. The resulting brake shoes, commonly known as composition brake shoes, have the desirable characteristic of possessing a much higher coefficient of friction when in contact with the steel wheels than the cast iron shoes. Since the composition shoes also have good wearing characteristics, it is advantageous to apply this type of shoe to locomotives and car equipment. However, because of the high coefficient of friction exhibited by these shoes, the braking forces must be reduced to obtain stopping patterns which are similar to the patterns obtained with iron shoes.

This reduction can be accomplished by reducing the air pressure coming to the brake cylinder, or changing the brake rigging leverage ratio. However, both of these methods are rather costly. An alternate scheme involves the removal of one-half of the brake rigging of the clasp brakes, converting the system to single shoe type. Since clasp brakes are generally designed so that the same cylinder forces both brake shoes against a common wheel through linkages, the two brake shoes are interconnected to each other through a common connection or brake strap. If this connection is removed incident with conversion to single shoe type, some form of new anchoring or fulcrum point must be provided for the remaining linkage.

New anchoring points have been successfully provided before in conversions from clasp to single brakes on passenger and freight cars. However, due to the close confines found on a diesel locomotive truck, there is no means in the prior art for successfully providing a new anchoring point on these trucks.

The present invention solves this problem with a simple but unique bracket which consists of three members. One of the members is permanently welded to an existing spring plank safety strap. Second and third members are rigidly connected to the first member by a pair of pins which pass through the three members. The second and third members at their lower ends are provided with terminal portions which extend laterally outwardly and are provided with downwardly extending flanges thereon. A slack adjuster is secured to the downwardly extending flange portions at one end, and at the other end the adjuster is secured to and provides a fixed fulcrum for the bottom of a vertical brake head actuating lever. The brake lever, in turn. is connected at its upper end to an actuating means driven by a pneumatic piston and engages a brake shoe whereby upon actuation of the lever by the pneumatic piston, the lever pivots about its lower end causing the brake shoe to engage a wheel.

The unique bracket of the present invention permits the use of composition brake shoes without any modification of the air brake valves or operating mechanisms. Further, it provides a means for converting to a single brake shoe assembly, which eliminates one-half of the brake rigging and levers. It particularly makes possible elimination of the connection straps around the wheels, which frequently come into contact with the outside faces of the wheels causing wear and ultimate failure of the straps. After the brake assembly has been converted, the labor required to change the wheels, traction motor and journal bearings, is greatly reduced since the complicated portion of the brake rigging, present before the conversion, has been eliminated and therefore, does not have to be removed or replaced. The present invention also provides a compact, inexpensive, extremely rugged bracket for accomplishing the above-desired objects.

Other objects and advantages of the present invention will become more apparent from the following disclosure when taken in combination with the accompanying drawings in which:

FIGURE 1 is a side elevational view of the bracket;

FIGURE 2 is a front elevational view of the bracket;

FIGURE 3 is a perspective view, partially in section, of a diesel locomotive truck illustrating the manner in which the bracket of the present invention is fastened to the locomotive in relation to the other elements of the brake assembly;

FIGURE 4 is a side elevational view of a spring plank safety strap with a stop plate secured on each end;

*Detailed description of the invention*

Figure 5:
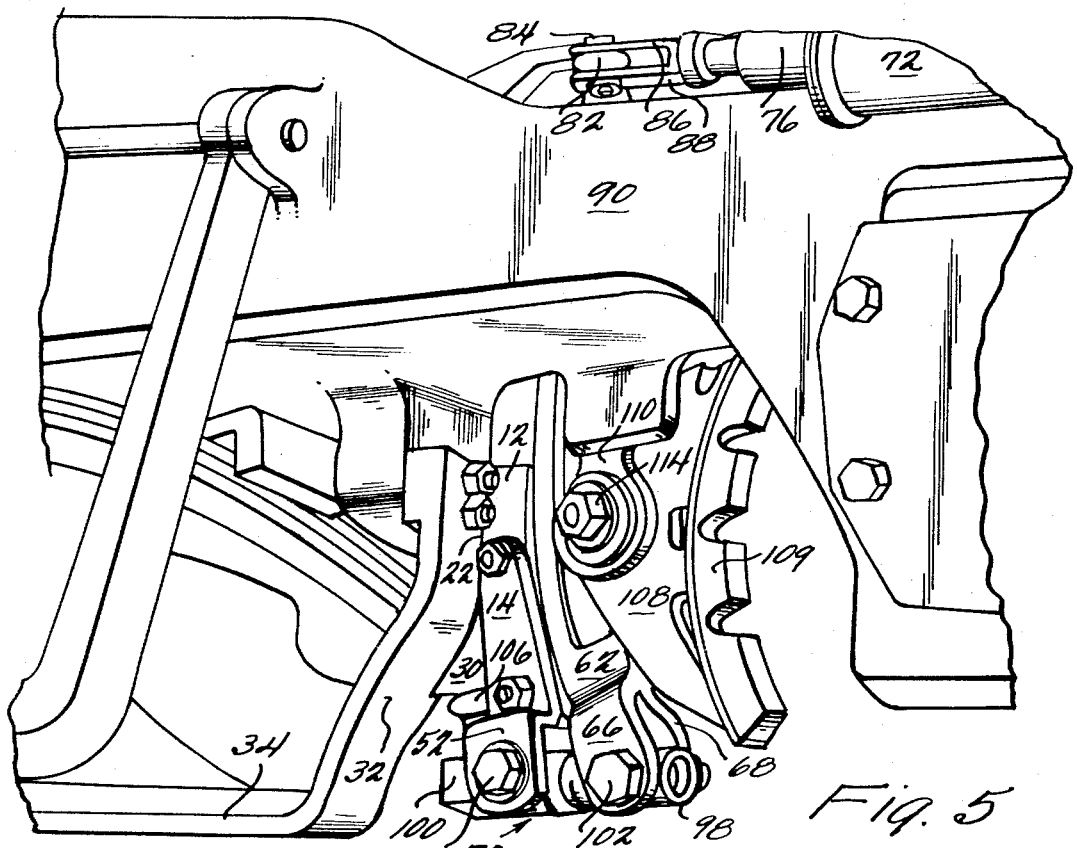
FIGURE 5 is a side view of the bracket and brake assembly with the wheel of the locomotive truck removed, as seen from outside the truck.

As shown in FIGURES 1 and 2, the conversion bracket of the present invention generally indicated by reference character 10, is made up of a first stop plate 12 and second and third plates 14 and 16. Stop plate 12, in its preferred form, is an elongated 1½ inch thick steel plate having an overall length of 13½ inches. The upper horizontally extending surface 20 of plate 12 is 2⅜ inches long and the plate has an inner surface 22 which extends at right angles from one end of surface 20 in a vertical direction. An outer surface 24 extends diagonally outwardly from the other end of surface 20 until the plate has a width of 3¼ inches at a point 4⅞ inches from the upper horizontal surface 20 of the plate. The outer surface 24 of the plate extends in a vertical direction for the next 2⅝ inches after which both the inner and outer surfaces 22 and 24, respectively, extend diagonally outwardly at such an angle that the lower terminal portions of surfaces 22 and 24 are spaced 2¹⁄₁₆ inches outwardly from their respective vertical portions.

Stop plate 12 is provided with two apertures 26 and 28. The center line of aperture 26 is located in the upper portion of plate 12, 5⅜ inches below the upper horizontal surface 20 and 1¹¹⁄₁₆ inches from the vertical surface 22 of plate 12. The center line of aperture 28 is located in the lower portion of plate 12, 7¹⁄₁₆ inches from the first aperture and 3⅝ inches from a vertical line extending from the inner vertical surface 22 of plate 12.

A triangular metallic gusset plate 30 is provided as a brace for the lower portion of plate 12. The gusset plate is welded to and extends between the diagonal portion of inner surface 22 and the diagonally extending surface 32 of the spring plank safety strap 34.

Members 14 and 16, in the preferred form, are elongated ¾ inch thick steel plates 13¹³⁄₁₆ inches in overall length and having rounded end portions. As viewed from the side in FIGURE 1, plates 14 and 16 have the same configuration. Therefore, to avoid repetition, the following description of plate 14 applies also to plate 16.

The lower portion 36 of plate 14 is 4 inches in width, however, the upper portion 38 of the plate is tapered in such a manner that the upper rounded end portion 40 of the plate has a radius of 1⁷⁄₁₆ inches. The inner surface 42 of plate 14, as viewed in FIGURE 1, extends in a straight line from the upper end of the plate to the lower end of the plate. Outer surface 44 extends diagonally outwardly from the upper rounded end portion 40 of the plate for 7⁵⁄₁₆ inches at which point, the plate reaches its maximum width of 4 inches and from that point, surfaces 42 and 44 extend parallel with respect to each other. Plate 14 is provided with a pair of apertures 46 and 48 which are aligned with the apertures in plate 12. The center line of aperture 46 is located 1¼ inches from the upper end of the plate 14 and 1⁷⁄₁₆ inches from inner surface 42. The center line of aperture 48 is located 8⁵⁄₁₆ inches below the upper end of the plate and 1⅞ inches from surface 42.

As shown in FIGURE 2, the lower portion 36 of the plate 14 is provided with a laterally projecting portion 50 which extends at right angles from the upper portion 38 of the plate 14 for 2⁷⁄₁₆ inches. The lateral portion 50 is, in turn, provided with a downwardly extending flange 52, which extends at right angles from the outer end of the lateral portion for 3½ inches. The plate is provided with an aperture 54 in the flange portion 52, which has a center line that is located 1½ inches above the lower end of the flange and 2 inches from outer surface 44.

The lower portion 36' of plate 16 is provided with a laterally projecting portion 50' which extends at right angles from the upper portion 38' of the plate for 3⅜ inches. The lateral portion 50' is, in turn, provided with a downwardly extending flange 52', which extends at right angles from the outer end of the lateral portion for 3½ inches. The plate is provided with an aperture 54' in the flange portion 52', which has a center line that is located 1½ inches above the lower end of the flange and 2 inches from outer surface 44'. The lateral portion of plate 16 extends outwardly farther than the lateral portion of plate 14. Therefore, the inner lateral surface 56' of flange 52' is spaced 4⅛ inches from a center line passing through plate 12 and the inner lateral surface 56 of flange 52 is spaced 3⁹⁄₁₆ inches from the center line of plate 12 whereby the brake adjusting screw is received within the flanges in such a way, that it is off center with respect to plate 12.

As shown in FIGURES 1, 2 and 5, the vertical portion of inner surface 22 of stop plate 12 is welded to the vertical portion of safety strap 34 adjacent the inner side wall of the safety strap. To lend additional strength and support to the stop plate 12, a gusset plate 30 is provided, which extends between and is welded to plate 12 and the diagonal surface 32 of the safety strap. Plates 14 and 16 are mounted on stop plate 12 by bolts 58 and 60, which pass through the aligned apertures 46, 26, 46' and 48, 28, 48' of the respective plates.

Figure 6:
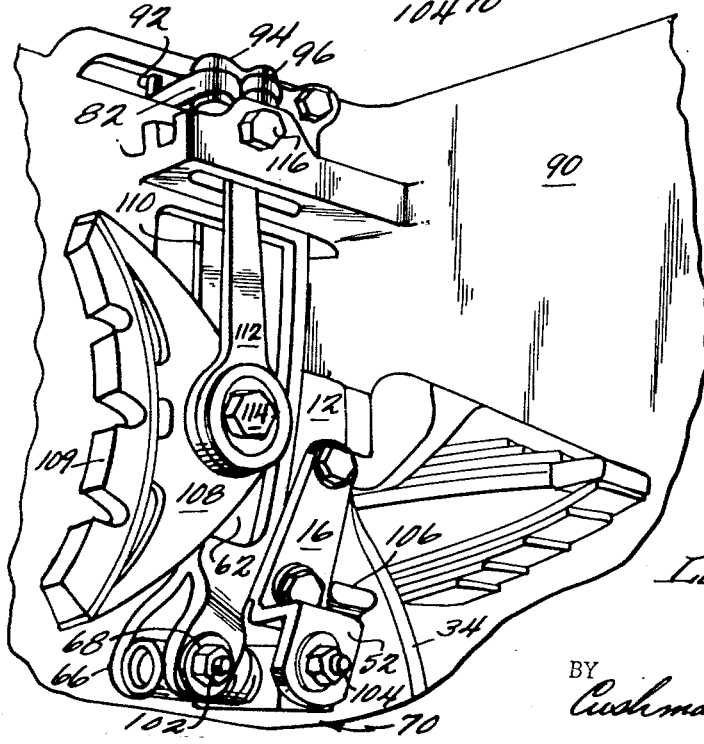
FIGURE 6 is a side elevational view of the bracket and brake assembly with the wheel of the locomotive truck removed, as seen from the inside of the truck.

As can be seen in FIGURE 1, the outer surfaces 44 and 44' of plates 14 and 16 extend outwardly beyond the outer surface 24 of stop plate 12. However, due to the positioning of stop plate 12, adjacent the inner edge of the safety strap as shown in FIGURES 5 and 6, vertical brake lever 62 contacts stop plate 12, rather than plates 14 and 16. To insure that the lower portion of the vertical brake lever 62, where it forks apart, does not contact plates 14 and 16 adjacent the inner ends of the laterally extending portions 50, 50', portions 64, 64' are cut out of plates 14 and 16. As shown in FIGURE 3, the clearance between the brake shoe and the wheel is very slight, even when the vertical brake lever is in its unactivated position wherein the lever rests against surface 24 of plate 12. Therefore, it is obviously quite important that the brake lever clear plates 14 and 16 to engage the surface 24 of plate 12, which is designed to insure that the maximum amount of clearance is provided between the brake shoe and the wheel when the brakes are not activated.

While the vertical brake lever 62 contacts plate 12, it can be seen from FIGURES 5 and 6 that the lever 62 contacts the plate off center. Since the vertical brake lever 62 is not centrally aligned with respect to plate 12, the lower flange portions 52 and 52' of the bracket are off set laterally inwardly so that the flanges 52 and 52' on the bracket are centrally aligned with respect to the flanges 66 and 68 of the lower forked portion of the vertical brake lever. In this way, the slack adjuster 70, which extends between and is received within the two sets of flanges, is properly aligned.

As shown in FIGURES 3 and 4, the stop plates 12 and 12' are welded at each end of spring plank safety strap 34 of the diesel locomotive truck whereby a bracket is provided for the brake assembly of each wheel. Of course, while only one set of wheels is shown, it is contemplated that similar brackets will be mounted on the spring plank safety straps extending between the other sets of wheels in the same way that the brackets shown in FIGURES 3 and 4 are attached to safety strap 34.

As shown in FIGURES 3, 5 and 6, the composition brake shoe assembly of the present invention is activated by a pneumatic cylinder and piston assembly generally indicated by reference character 72, which is connected by means of line 74 to a suitable source of pressurized air (not shown). The pneumatic cylinder may be any one of various pneumatic assemblies well known in the prior art, such as the one illustrated in FIGURE 3, wherein piston rod 76 connected to piston 78 is extended outwardly when air pressure is admitted to the cylinder 72 and which is retracted by means of spring 80 when the air pressure is relieved.

Piston rod 76 is pivotally connected to a horizontally extending lever 82 by pin 84, which passes through aligned apertures in flanges 86, 88 and in lever 82. Lever 82 is pivotally mounted intermediate its ends on frame member 90 by pin 92 and extends inwardly through an opening in member 90. The lever is connected at its inner end by means of U-links 94 and 96, one of which is pivotally connected to the lever 82, the other of which is pivotally connected to the upper end of vertical brake lever 62. Brake lever 62 is provided at its lower terminal portion with flanges 66 and 68 within which is received one end of slack adjuster 70, which provides a fixed fulcrum for the vertical brake lever.

Slack adjuster 70 is made up of two elements 98 and 100 which are mounted on the vertical brake lever 62 and the bracket 10 by bolts 102 and 104, respectively. Element 98 is threadedly received in element 100 and can be threaded into or out of element 100 to change the pivot or fulcrum point of vertical brake lever 62. This can be done when element 100 is unbolted from bracket 10 and lowered below flanges 52 and 52' of the bracket.

Element 100 is provided with an abutment 106 which protrudes from the upper surface of element 100. The abutment engages the inner surfaces 22, 42 and 42' of plates 12, 14 and 16 to prevent any clockwise rotation, as viewed in FIGURE 5, of the slack adjuster 70 about bolt 104 when the brake is applied. This insures that the vertical brake lever 62 has a fixed fulcrum since the direction of the forces exerted on the slack adjuster, when the brake is applied, is horizontal.

Brake head 108, including shoe 109, is pivotally connected between arms 110 and 112 by means of bolt 114. These levers are, in turn, pivotally connected at their upper ends by bolt 116 which extends through a portion of the frame of the truck. The rear portion of the brake head 108 straddles and is pivotally mounted on vertical lever 62 by bolt 114, whereby the lever 62 mantains the brake shoe in the proper position relative to the wheel of the locomotive truck.

In operation, when air is supplied to cylinder 72, piston rod 76 is extended and lever 82, as viewed from above, is pivoted in a clockwise direction about point 92. This causes the inner portion of the lever, as viewed in FIGURE 6, to move to the left and this movement, in turn, causes the upper portion of the vertical brake lever 62 to move to the left as it pivots about its lower terminal portion. Since brake shoe 109 is mounted on the vertically extending brake lever 62, the brake shoe is also moved to the left against the wheel. Upon retraction of piston rod 76, the lever 82 pivots counter-clockwise causing the inner portion of the lever 82 to pivot toward the right, to the position shown in FIGURE 6. This causes lever 62 to pivot about its terminal portion until the lever engages stop plate 12. Vertical brake lever 62, in turn, retracts brake shoe 109 away from the wheel of the locomotive truck.

While the preferred form of the invention has been shown and described, it is to be understood that all suitable modifications and equivalents may be resorted to which fall within the scope of the invention.

What is claimed is:

1. A metal bracket for a single shoe brake assembly comprising an elongated stop plate adapted to be secured to a spring plank safety strap, a first elongated plate rigidly secured to one side of said stop plate, said first plate having a laterally extending portion provided with a downwardly extending flange, a second elongated plate rigidly secured to the other side of said stop plate, said second plate having a laterally extending portion provided with a downwardly extending flange wherein the bracket is adapted to receive a slack adjuster between the flanges.

2. The metal bracket of claim 1 wherein the laterally extending portions of the first and second plates are in a common plane and the flanges extend from the outer ends of the laterally extending portions.

3. The metal bracket of claim 2 wherein the laterally extending portion of the second plate is longer than the laterally extending portion of the first plate whereby a slack adjuster received between the flanges is not centrally aligned with respect to the stop plate.

4. The metal bracket of claim 3 wherein a lower portion of the stop plate extends diagonally from an upper portion of the stop plate, said lower portion having an outer surface adapted to be engaged by a vertical brake lever and an inner surface adapted to be engaged by an abutment provided on a slack adjuster.

5. The metal bracket of claim 3 wherein inner adjacent surfaces of the laterally extending portions are recessed.

6. The metal bracket of claim 3 wherein the lateral portions extend at substantially right angles to respective upper portions of said first and second plates and the flanges extend at right angles to the respective lateral portions.

7. A single shoe brake assembly comprising a metal bracket having an elongated stop plate secured to a spring plank safety strap, said bracket having a first elongated plate rigidly secured to one side of said stop plate, said first plate having a laterally extending portion provided with a downwardly extending flange, said bracket having a second elongated plate rigidly secured to the other side of said stop plate, said second stop plate having a laterally extending portion provided with a downwardly extending flange, a slack adjuster mounted within said flanges, a vertical brake lever pivotally mounted at its lower end to the slack adjuster, a brake shoe mounted on said vertical lever whereby upon actuation of the brake lever about its pivot, the brake shoe engages a wheel.

8. The single shoe brake assembly of claim 7 wherein the laterally extending portions of the first and second plates are in a common plane and the flanges extend from the outer ends of the laterally extending portions.

9. The single shoe brake assembly of claim 8 wherein the laterally extending portion of the second plate is longer than the laterally extending portion of the first plate whereby the slack adjuster mounted between the flanges is not centrally aligned with respect to the stop plate.

10. The single shoe brake assembly of claim 9 wherein a lower portion of the stop plate extends diagonally from an upper portion of the stop plate, said lower portion having an outer surface, which is engaged by the vertical brake lever when the lever is in an unactuated position, and an inner surface, which is engaged by an abutment provided on the slack adjuster.

11. The single shoe brake assembly of claim 7 wherein inner adjacent surfaces of the laterally extending portions are recessed.

12. The single shoe brake assembly of claim 7 wherein the lateral portions extend at substantially right angles to respective upper portions of said first and second plates and the flanges extend at right angles to the respective lateral portions.

References Cited

UNITED STATES PATENTS

| | | | |
|---|---|---|---|
| 275,831 | 4/1883 | Lanpher | 188—153 |
| 2,118,236 | 5/1938 | Schwentler | 188—153 |
| 3,093,214 | 6/1963 | Polanin | 188—153 |

DUANE A. REGER, *Primary Examiner.*

U.S. Cl. X.R.

188—197